US007527552B2

(12) United States Patent
  Ka

(10) Patent No.: US 7,527,552 B2
(45) Date of Patent: May 5, 2009

(54) STRUCTURE OF DEMISTER HOSE FOR VEHICLES

(75) Inventor: Suk-sun Ka, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 10/973,460

(22) Filed: Oct. 27, 2004

(65) Prior Publication Data

US 2005/0266788 A1    Dec. 1, 2005

(30) Foreign Application Priority Data

May 17, 2004    (KR)    ............... 10-2004-0034793

(51) Int. Cl.
  *B60H 1/28*    (2006.01)
(52) U.S. Cl. .................................... 454/150
(58) Field of Classification Search ............... 454/155, 454/109, 315, 285; 285/62
  See application file for complete search history.

(56) References Cited

U.S. PATENT DOCUMENTS 3,927,607 A * 12/1975 Jobst .................... 454/127

FOREIGN PATENT DOCUMENTS

KR    10-2002-0096725    12/2002

* cited by examiner

*Primary Examiner*—Steve McAllister
*Assistant Examiner*—Helena Kosanovic
(74) *Attorney, Agent, or Firm*—Greenblum & Bernstein P.L.C.

(57) ABSTRACT

A structure of a demister hose for vehicles includes a demister outlet formed in a crash pad, a seal pad provided along an outer circumferential edge of the demister outlet and a restraint that guides defrost air toward the demister outlet and that prevents the seal pad from protruding toward the interior of the demister hose.

2 Claims, 2 Drawing Sheets

STRUCTURE OF DEMISTER HOSE FOR VEHICLES

RELATED APPLICATIONS

The present disclosure relates to subject matter contained in Korean Application No. 10-2004-34793, filed on May 17, 2004, which is herein expressly incorporated by reference in its entirety.

BACKGROUND OF THE INVENTION

1. Field of the Invention

The present invention relates in general to a demister hose, and more particularly to the structure of a demister hose for vehicles, wherein one end of the demister hose is divided along the circumference thereof into outer and inner branches so that the outer branch corresponds to a seal pad, and the inner branch corresponds to a demister outlet, thereby preventing the seal pad from protruding toward the interior of the demister hose upon being compressed, and thus eliminating the need for any operation for hiding the seal pad so as not to be seen from the outside, resulting in improvement in the aesthetic value and quality of products, as well as operational efficiency.

2. Description of the Related Art

In general, vehicles have an air conditioner for keeping the passenger compartment in a pleasant condition and providing defrosting to automotive vehicle windows.

Upon operating such an air conditioner for defrosting, defrost air is blown onto a vehicle windshield through a defroster duct. In this case, part of the blown defrost air flows through a demister hose connected to the defroster duct and is discharged from a demister outlet, resulting in defrosting a vehicle's door windows.

FIG. 1 is a schematic view illustrating the structure of a conventional demister hose.

As shown in FIG. 1, at one lateral side of a vehicle crash pad 10 is formed a demister outlet 20, and a demister hose 40 is located at the lower side of the demister outlet 20.

The demister hose 40 communicates with a defroster duct (not shown), and serves to guide a part of the defrost air, which flows through the defroster duct for defrosting a vehicle windshield, toward the demister outlet 20 for defrosting vehicle door windows.

In this case, one end of the demister hose 40 has a size larger than an outer contour of the demister outlet 20 so as to surround the lower end of the demister outlet 20. Between the demister outlet 20 and the demister hose 40 is provided a seal pad 30.

The seal pad 30 serves to prevent the defrost air, which flows through the demister hose 40, from leaking from a gap between the demister hose 40 and the demister outlet 20, and to assure that the defrost air is only discharged through the demister outlet 20.

The problem with the above described conventional structure is that the demister hose 40 excessively compresses the seal pad 30 when it is fitted around the demister outlet 20, thereby causing the seal pad 30 to protrude toward the interior of the demister hose 40, and thus be disadvantageously seen from the outside through the demister outlet 20.

Even if the seal pad 30 is appropriately compressed so as not to protrude toward the interior of the demister hose 40, since the end of the demister hose 40 is tapered outward, the seal pad 30 may be seen through the demister outlet 20, resulting in a deterioration in the aesthetic value and quality of products.

Such an exposure of the seal pad 30 requires somewhat troublesome manual operation for removing or hiding the seal pad 30 so as not to be seen from the outside, resulting in deterioration in operational efficiency.

SUMMARY OF THE INVENTION

Therefore, the present invention has been made in view of the above problems, and it is an object of the present invention to provide a structure of a demister hose for vehicles wherein one end of the demister hose, which serves to guide defrost air toward a demister outlet, is divided along the circumference thereof into outer and inner branches, so that the outer branch has a size larger than an outer contour of the demister outlet so as to correspond to a seal pad, and the inner branch corresponds to the demister outlet so as to prevent the seal pad from being seen through the demister outlet, thereby preventing the defrost air from leaking from a gap between the demister outlet and the demister hose, as well as preventing the seal pad from protruding toward the interior of the demister hose upon being compressed, thus eliminating the need for any operation for hiding the seal pad so as not to be seen from the outside, resulting in an improvement in the aesthetic value and quality of products, as well as in operational efficiency.

In accordance with the present invention, the above and other objects can be accomplished by the provision of structure of a demister hose for vehicles comprising: a demister outlet formed at one lateral side of a crash pad; a seal pad provided along an outer circumferential edge of the demister outlet; and a restraint for guiding defrost air toward the demister outlet, and for preventing the seal pad from protruding toward the interior of the demister hose.

Preferably, the restraint may have outer and inner branches formed by dividing one end of the demister hose along the circumference thereof. The outer branch may have a size larger than an outer contour of the demister outlet so as to correspond to the seal pad, and the inner branch may correspond to the demister outlet so as to prevent the seal pad from being seen from the outside through the interior of the demister hose.

With such a configuration as stated above, it is possible to prevent defrost air from leaking from a gap between the demister hose and a demister outlet, thereby improving defrosting efficiency. Further, it is possible to prevent a seal pad from protruding toward the interior of the demister hose upon being compressed, and thus to eliminate the need for any operation for hiding the seal pad so as not to be seen from the outside, resulting in improvement in the aesthetic value and quality of products, as well as in operational efficiency.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Now, a preferred embodiment of the invention will be explained with reference to the accompanying drawings.

Further, the present embodiment is given by way of illustration and example only, and is not intended to limit the range of the present invention. Multiple variations and modifications are possible through the technical teachings of the present invention.

Figure 1:
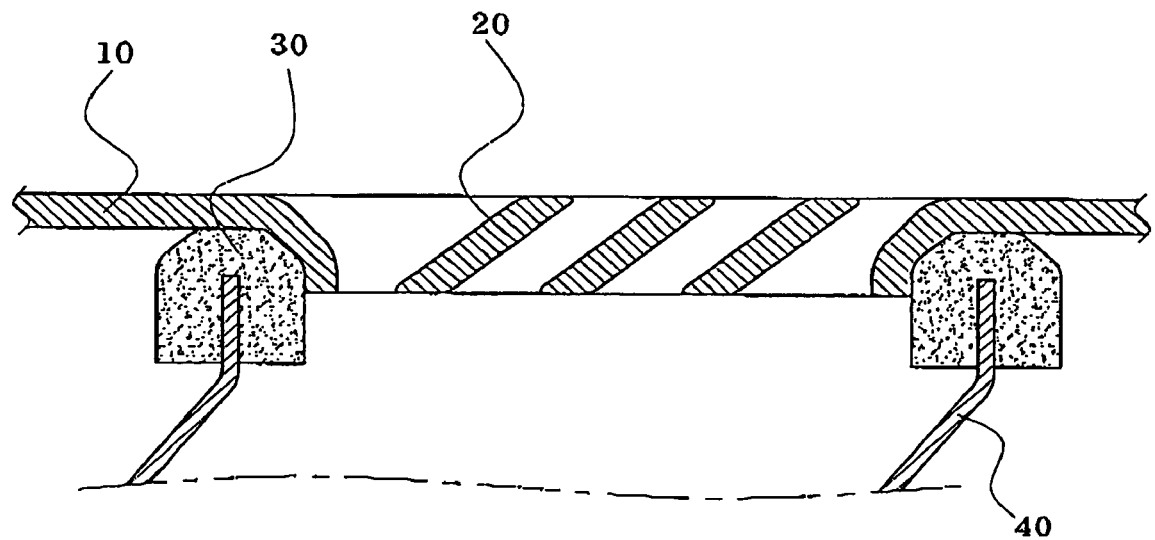
FIG. 1 is a schematic view illustrating the structure of a conventional demister hose for vehicles.
Figure 2:
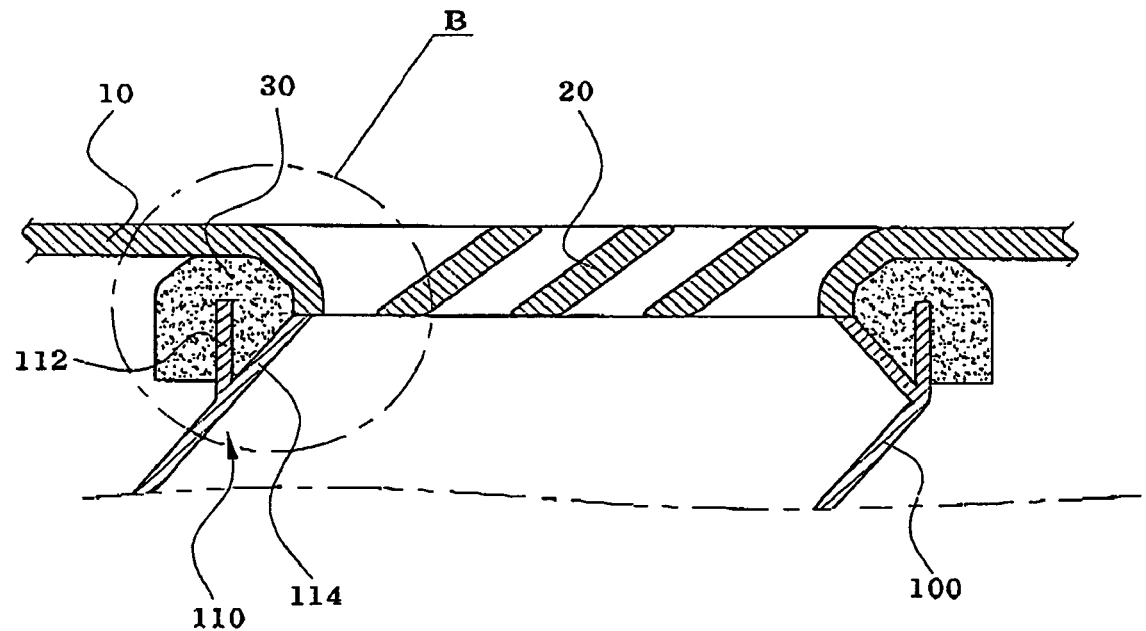
FIG. 2 is a schematic view illustrating the structure of a demister hose for vehicles in accordance with the present invention.
Figure 3:
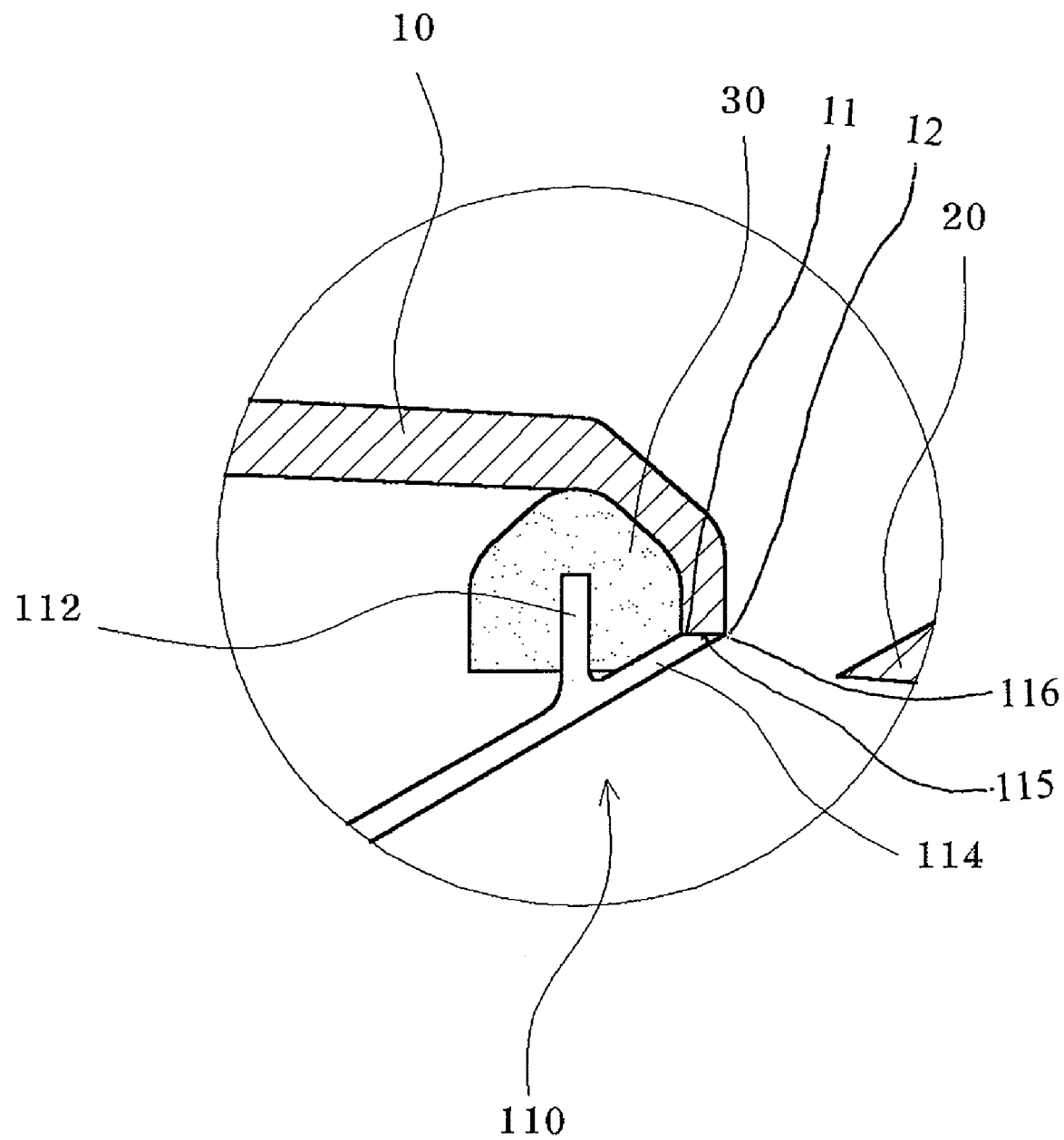
FIG. 3 is an enlarged view illustrating an important portion of the structure of the demister hose in accordance with the present invention.

FIG. 2 is a schematic view illustrating the structure of a demister hose for vehicles in accordance with the present invention. FIG. 3 is an enlarged view illustrating an important portion of the structure of the demister hose in accordance with the present invention.

As shown in FIGS. 2 and 3, at one lateral side of the vehicle crash pad 10 is formed the demister outlet 20, and a demister hose of the present invention, which is designated as reference numeral 100, is located at the lower side of the demister outlet 20. Between the demister hose 100 and the demister outlet 20 is provided a seal pad 30.

The seal pad 30 serves to prevent defrost air, which flows through the demister hose 100, from leaking from a gap between the demister hose 100 and the demister outlet 20, thereby achieving improvement in defrosting efficiency.

In the present invention, one end of the demister hose 100 forms a restraint 110, which serves not only to connect the demister hose 100 to the seal pad 30, but also to prevent the seal pad 30 from protruding toward the interior of the demister hose 100.

The restraint 110 consists of an outer branch 112, and an inner branch 114, which are formed by dividing one end of the demister hose 100 along the circumference thereof. The outer branch 112 has a size larger than an outer contour of the demister outlet 20 so as to correspond to the seal pad 30, whereas the inner branch 114 is configured so as to accurately correspond to an inner contour of the demister outlet 20, thereby serving to guide the defrost air.

The inner branch 114 also serves to prevent the seal pad 30 from protruding toward the interior of the demister hose 100 and being seen from the outside. Thereby, in a completely fitted state of the demister hose 100, the inner branch 114 of the restraint 110 smartly finishes the demister hose 100, resulting in an improvement in aesthetic value thereof. In such a fitted state, meanwhile, the outer branch 112 of the restraint 110 comes into contact with the seal pad 30, which is located outwardly of the demister outlet 20, thereby compressing the seal pad 30. Also, the end face 115 of the inner branch 114 is configured to abut the end face 11 of the demister outlet 10, such that the innermost periphery 116 of the end face 115 of the inner branch 114 is substantially aligned with the innermost periphery 12 of the end face 11 of the demister outlet 10, as shown in FIG. 3.

In this case, although the seal pad 30 is deformed as it is compressed, the inner branch 114 of the restraint 110 surely prevents the deformed seal pad 30 from protruding toward the interior of the demister hose 100, and also from being seen from the outside.

As apparent from the above description, the present invention provides the structure of a demister hose for vehicles, which can prevent defrost air from leaking from a gap between the demister hose and a demister outlet, thereby improving defrosting efficiency.

Further, according to the present invention, it is possible to prevent a seal pad from protruding toward the interior of the demister hose upon being compressed, and thus to eliminate the need for any operation for hiding the seal pad so as not to be seen from the outside, resulting in an improvement in the aesthetic value and quality of products, as well as in operational efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A structure of a demister hose for vehicles comprising:
   a demister outlet formed in a crash pad, the demister outlet having an end face provided at an end thereof including an innermost periphery thereof;
   a seal pad provided along an outer circumferential edge of the demister outlet; and
   a restraint configured to guide defrost air toward the demister outlet and to prevent the seal pad from protruding toward the interior of the demister hose,
   wherein the restraint includes both an outer branch and an inner branch which are provided at an end thereof, the inner branch being configured to correspond to the demister outlet and to have an outermost end face provided at an end thereof including an innermost periphery thereof, and
   wherein the outermost end face of the inner branch is configured to abut the end face of the demister outlet, such that the innermost periphery of the outermost end face of the inner branch is substantially contiguous with the innermost periphery of the end face of the demister outlet, the innermost periphery of the outermost end face of the inner branch being a periphery closest to a central axis of the demister hose.

2. The structure as set forth in claim 1,
   wherein the restraint has the outer and inner branches formed by dividing one end of the demister hose along the circumference thereof,
   wherein the outer branch has a size larger than an outer contour of the demister outlet so as to correspond to the seal pad, and
   wherein the inner branch corresponding to the demister outlet prevents the seal pad from protruding toward the interior of the demister hose.

* * * * *